United States Patent Office 3,660,411
Patented May 2, 1972

---

3,660,411
ESTERIFICATION PROCESS
Joseph Levy, Paramus, and William Walker, Rutherford, N.J., assignors to Universal Oil Products Company, Des Plaines, Ill.
No Drawing. Filed June 15, 1970, Ser. No. 46,514
Int. Cl. C07d 29/24
U.S. Cl. 260—293.81          10 Claims

ABSTRACT OF THE DISCLOSURE

Esterification of a benzoic acid with a tertiary amino alcohol by refluxing in an inert solvent and formic acid catalyst. In a specific embodiment, p-nitrobenzoic acid is esterified with diethylaminoethanol to prepare diethylaminoethyl p-nitrobenzoate.

BACKGROUND OF THE INVENTION

Esters of benzoic acids and tertiary amino alcohols are valuable intermediates for the preparation of local anesthetic drugs. For example, the p-nitrobenzoate of diethylaminoethanol affords the well known local anesthetic Procaine upon reduction of the nitro group to the corresponding amine. The most generally utilized methods of preparing such esters as exemplified by diethylaminoethyl p-nitrobenzoate comprise (1) alcoholysis of methyl or ethyl p-nitrobenzoate by means of diethylaminoethanol, (2) reacting p-nitrobenzoyl chloride with diethylaminoethanol, (3) condensing beta-chloroethyl p-nitrobenzoate with diethylamine, (4) reacting sodium p-nitrobenzoate with diethylaminoethyl chloride, and (5) direct esterification of p-nitrobenzoic acid with diethylaminoethanol.

While the direct esterification would appear to be the simplest and most advantageous procedure, in actual practice it is found to be beset with many difficulties which seriously mitigate against its utility. Thus, the usual method of catalyzing the esterification reaction by means of mineral acids actually reduces the yields and rate of the reaction probably because of the presence of the basic amino group in the alcohol. Accordingly, one method proposed in the prior art is the non-catalyzed esterification procedure in which the water produced is removed by azeotropic distillation. However, this procedure is quite prolonged, requiring about twenty-four hours to go to completion, and also is found to give rise to dark colored solutions, from which the p-nitrobenzoate ester must be isolated and decolorized prior to reduction to give a satisfactory final product. The yields also are reported to be only about 79–84% of theory.

DESCRIPTION OF THE INVENTION

The present invention provides an improved method of preparing esters of benzoic acids with tertiary amino alcohols. It now has been found that formic acid serves as a highly effective catalyst for this reaction. Not only is the rate of reaction markedly increased so that the esterification is substantially completed in about 12–14 hours, but a light yellow solution is obtained free of dark colored impurities, which needs only to be extracted with aqueous sodium hydroxide for recovery of unreacted p-nitrobenzoic acid, after which it may be used directly for reduction to the amino derivative. Furthermore, the unreacted nitrobenzoic acid is recovered in a high state of purity and may be recycled in the process. The yield of ester calculated on consumed acid is virtually quantitative. The procedure is therefore significantly more efficient, easier to operate and more economical than the processes of the prior art.

As hereinbefore set forth, the improved process of the present invention is used for the esterification of a benzoic acid. Illustrative benzoic acids include benzoic acid, p-nitrobenzoic acid, o-nitrobenzoic acid, m-nitrobenzoic acid and alkyl, alkoxy and/or halogen substituted nitrobenzoic acids. The alkyl substituent preferably is lower alkyl, containing from 1 to 5 carbon atoms, and thus will be selected from methyl, ethyl, propyl, butyl and amyl. The alkoxy substituent similarly preferably is lower alkoxy, containing from 1 to 5 carbon atoms, and thus will be selected from methoxy, ethoxy, propoxy, butoxy and pentoxy. The halogen substituent is selected from chloro, bromo, iodo and fluoro.

Any suitable tertiary amino alcohol is used in accordance with the present invention and may be illustrated by the following general structure:

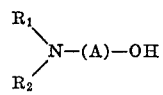

in which $R_1$ and $R_2$ are lower alkyl of 1–5 carbons or, when taken together with the nitrogen atom, constitute a cyclic nitrogen containing group selected from pyrrolidine, piperidine and morpholine groups, and A is a straight or branched chain alkylene group of 2–5 carbons. Illustrative examples are diethylaminoethanol, dimethylaminoethanol, di-n-propylaminoethanol, di-isopropyl-aminoethanol, di-isobutyl-aminoethanol, 2 - pyrrolidinoethanol, 2-morpholinoethanol, 3-dimethylaminopropanol, 3-diethylaminopropanol, 1-diethylaminopropanol-2, etc.

The reaction is effected in any suitable manner. In a preferred method the reactants are refluxed in an inert water immiscible solvent, which acts as an azeotroping agent for removal of the water produced in the esterification. Any suitable inert water immiscible solvent may be used and preferably comprises xylene. Other solvents include chlorobenzene, ethylbenzene, cumene, etc. The exact temperature of reaction will depend upon the particular solvent and generaly will be within the range of from about 130° to about 150° C. The pressure is not critical and may range from atmospheric to 100 p.s.i. or more. The time of reflux will be sufficient to effect the desired esterification but, as hereinbefore set forth, is considerably less than required in the absence of the catalyst. In general, the time of reaction will be from about 10 to about 16 hours.

As hereinbefore set forth, the improved results are obtained when the reaction is effected in the presence of formic acid catalyst. The amount of formic acid may be varied between wide limits as, for example, from about 0.05 to about 0.5 but generally from about 0.1 to about 0.15 mole of formic acid per mole of amino alcohol is sufficient. In general, the benzoic acid and amino alcohol are in equal molar amounts, although either reactant and particularly the acid may be used in a slight excess.

As hereinbefore set forth, in a preferred method, the reaction is conducted under reflux in a reaction vessel provided with a water separator. The water formed during the reaction is removed continuously and may contain some formic acid and also some amino alcohol. At the conclusion of the reaction, the reaction mixture may then be treated with a suitable alkaline agent, particularly aqueous sodium hydroxide, to extract unreacted benzoic acid which may be separated and recycled for further use in the process.

As hereinbefore set forth, the ester is recovered as a light yellow solution in xylene and, as another advantage to the process of the present invention, it may be used directly for reduction to the amino derivative for use in preparing the desired pharmaceutical product.

The following examples are introduced to illustrate further the novelty and utility of the present invention but not with the intention of unduly limiting the same.

EXAMPLE I

In this example, 310 grams diethylaminoethanol (2.64 moles) and 464 grams p-nitrobenzoic acid (2.78 moles) were charged with 900 cc. xylene into a 5-liter flask fitted with a stirrer, thermometer and reflux condenser connected to a water separator filled with xylene. 16 grams 90% formic acid then were added and the mixture heated to reflux. During about a fourteen hour period under reflux the temperature of the reaction mixture gradually rose from about 133° C. to 150° C., and a total of 58 cc. of aqueous phase collected in the water separator, after which the rate of evolution of water markedly decreased and the reaction was terminated. The water layer in the separator was found to contain about 15% of formic acid plus diethylamnioethanol which had also co-distilled out during the reaction. The reaction mixture then was cooled to about 60° C. and the unreacted p-nitrobenzoic acid was extracted into 500 g. of 5% aqueous sodium hydroxide, followed by a 100 g. water wash. There were obtained 1485 g. of light yellow xylene solution of diethylaminoethyl p-nitrobenzoate, analyzing 40.8% ester (606 g., 2.27 moles). From the aqueous alkaline extract there were recovered 85 g. of p-nitrobenzoate acid. Accordingly, 379 g. (2.27 moles) were converted to ester, and the yield of ester on consumed p-nitrobenzoic acid is, therefore, virtually quantitative.

As hereinbefore set forth, another advantage of the present invention is that the xylene solution as recovered in the above manner may be used directly in further processing to prepared Procaine. This confirms both the high yield and the high purity of the ester. In this run, 120 g. of the ester solution recovered in the above manner was hydrogenated in a Parr hydrogenator in the presence of palladium-carbon catalyst, and the Procaine base extracted into aqueous hydrochloric acid and isolated by standard methods as Procaine hydrochloride. There were obtained 44 g. colorless Procaine HCl (88% yield) melting at 154.5°–155.5° C. In addition 2.7 g. Procaine base was recovered from the mother liquors on adding alkali, for a total overall yield of 94% of theory on consumed p-nitrobenzoic acid.

EXAMPLE II

In this example, p-nitrobenzoic acid is esterified with dibutylaminopropanol. The esterification is effected in substantially the same manner as described in Example I and the xylene solution of dibutylaminopropyl p-nitrobenzoate is hydrogenated to form dibutylaminopropyl p-aminobenzoate, the sulfate of which is known as Butacaine sulfate.

EXAMPLE III

This example describes the esterification of benzoic acid with 2-methylpiperidinopropanol. The esterification is effected in the presence of formic acid catalyst and xylene solvent in substantially the same manner as described in Example I. The xylene solution then is treated with aqueous hydrochloride acid in substantially the same manner as described in Example I to prepare 2-methylpiperidinopropyl benzoate, the hydrochloride of which is known as Piperocaine hydrochloride.

We claim as our invention:

1. A process for the esterification of a benzoic acid with a tertiary amino alcohol, which comprises heating said benzoic acid and said alcohol under reflux in an inert water immiscible solvent and formic acid catalyst, removing water formed durng the reaction, and recovering the ester product.

2. The process of claim 1 in which said benzoic acid is p-nitrobenzoic acid.

3. The process of claim 1 in which said benzoic acid is benzoic acid.

4. The process of claim 1 in which said tertiary amino alcohol is di-lower-alkyl-aminoalkanol containing from 2 to 5 carbon atoms in the alkanol moiety.

5. The process of claim 4 in which said tertiary amino alcohol is di-ethyl-aminoethanol.

6. The process of claim 4 in which said tertiary amino alcohol is dibutyl-aminopropanol.

7. The process of claim 1 in which said tertiary amino alcohol is 2-methylpiperidinopropanol.

8. The process of claim 1 in which said solvent is xylene.

9. The process of claim 1 in which said reflux is at a temperature within the range of from about 130° to about 150° C.

10. The process of claim 1 in which the formic acid is in an amount of from about 0.1 to about 0.15 mole per mole of amino alcohol.

References Cited

UNITED STATES PATENTS 2,727,040 12/1955 Clinton et al. _____ 260—294.3
3,134,805 5/1964 Tullar _____ 260—472

HENRY R. JILES, Primary Examiner

G. T. TODD, Assistant Examiner

U.S. Cl. X.R.

260—247.2 B, 293.82, 326.3, 472, 477, 691